United States Patent [19]

Wohlmuth

[11] 4,438,598

[45] Mar. 27, 1984

[54] SURFACE TEMPERATURE CONTROL APPARATUS

[75] Inventor: Clinton J. Wohlmuth, Columbus, Ind.

[73] Assignee: Cummins Engine Company, Inc., Columbus, Ind.

[21] Appl. No.: 325,975

[22] Filed: Nov. 30, 1981

[51] Int. Cl.³ .............................................. B24B 49/14
[52] U.S. Cl. .................................... 51/165.73; 474/131
[58] Field of Search ......... 51/165.72, 165.73, 134.5 R; 374/127, 131

[56] References Cited

U.S. PATENT DOCUMENTS 2,716,368 8/1955 Thompson ...................... 51/165.73
3,486,378 12/1969 Carlson ................................. 73/343

FOREIGN PATENT DOCUMENTS 484977 9/1975 U.S.S.R. ............................ 51/165.73
509416 4/1976 U.S.S.R. ............................ 51/165.73
512044 9/1976 U.S.S.R. ............................ 51/165.73

Primary Examiner—Harold D. Whitehead

Attorney, Agent, or Firm—Neuman, Williams, Anderson & Olson

[57] ABSTRACT

An apparatus is provided for controlling the temperature of a first surface when the latter is frictionally engaged by a second surface and the surfaces are in relative motion. The apparatus includes a thermal sensing means having a first section exposed on one of the surfaces. The thermal sensing means has an exposed second section which is spaced from the surfaces. Means is provided for effecting relative movement of at least one surface while said surfaces are in frictional engagement. Means is also provided for effecting adjustment of the surfaces to a non-engaging relation. A detecting means is provided having a segment thereof in a predetermined temperature-detecting relation with the second section of the thermal sensing means and being operatively connected to the surface-adjusting means whereby relative positioning of at least one of the surfaces is responsive to the temperature detected by the detecting means segment from the second section of the thermal sensing means.

8 Claims, 3 Drawing Figures

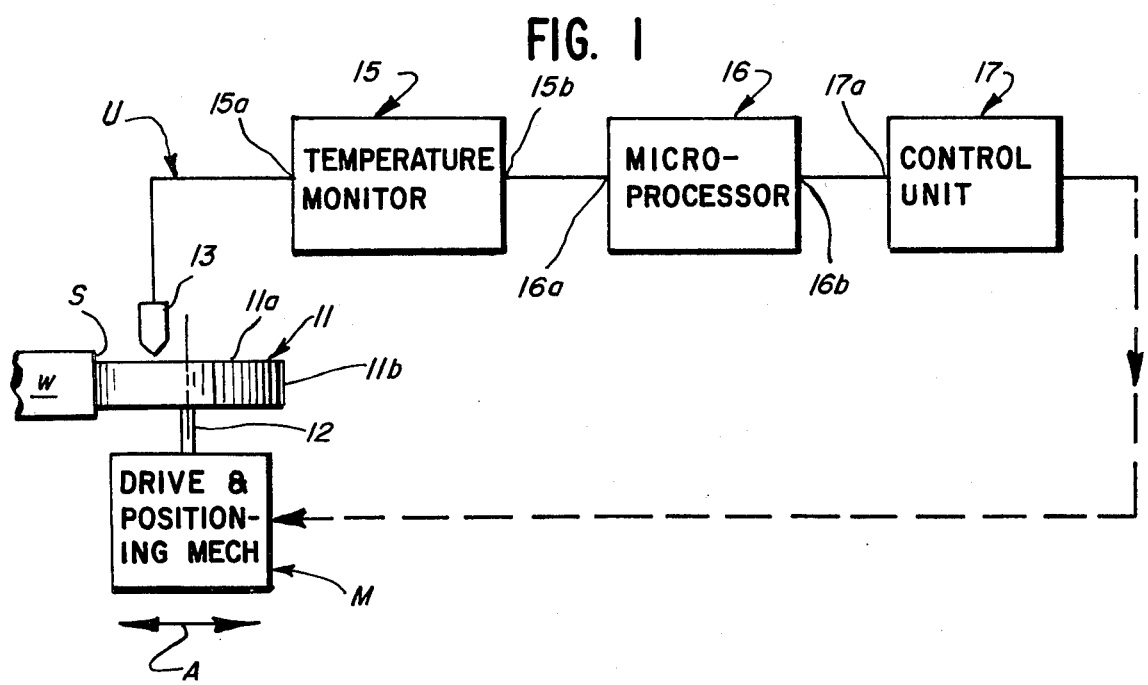
FIG. 1
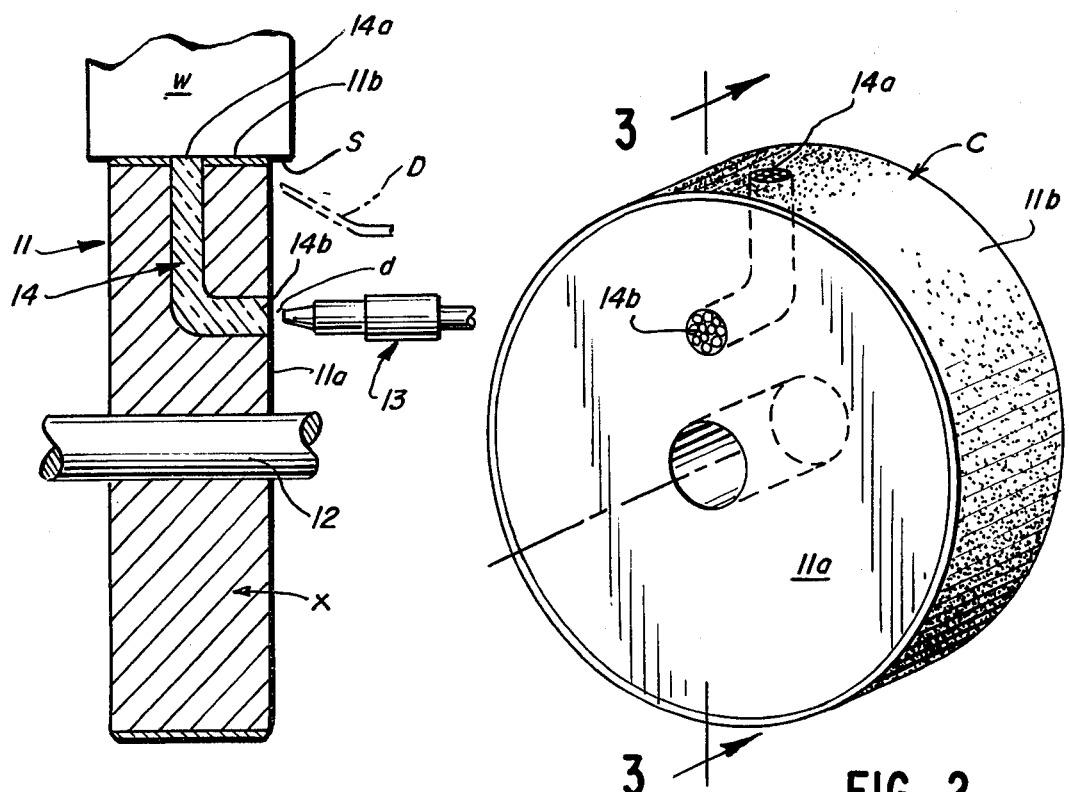
FIG. 3
FIG. 2

SURFACE TEMPERATURE CONTROL APPARATUS

BACKGROUND OF THE INVENTION

During a grinding, polishing or similar operation performed on a workpiece, it is oftentimes critical that the temperature generated between the workpiece surface and the tool surface in contact therewith be accurately monitored and not exceed a predetermined amount. Where such temperatures are not properly controlled, important surface characteristics (e.g., hardness, wear-life, appearance and contour of the workpiece and/or the tool) may be seriously impaired.

In the past, the temperature control in such a situation depended to a substantial extent upon the skill and experience of the operator, and upon the type, volume, temperature and flow direction of the coolant circulated across the workpiece and tool surfaces. Various apparatus have heretofore been provided in an effort to attain better surface temperature control; however, because of certain inherent design features such apparatus has been beset with one or more of the following shortcomings: (a) the thermal sensing means or the detecting means were exposed to splash from the circulating coolant and thus, the accuracy of such means was impaired; (b) the location of the thermal sensing means on the tool surface caused unbalancing forces or stresses to develop within the tool thereby seriously shortening wear life; (c) the apparatus required an inordinate amount of service and maintenance; (d) the apparatus embodied numerous, costly and fragile components which were highly susceptible to malfunction; and (e) the apparatus was incapable of being utilized in conjunction with a variety of machining tools.

SUMMARY OF THE INVENTION

Thus, it is an object of the invention to provide an apparatus of the type described which effectively avoids the aforenoted shortcomings.

It is a further object to provide an apparatus of simple, inexpensive construction and yet, one which registers an accurate temperature reading of the area of the workpiece surface wherein temperature control is most critical.

It is a further object to provide an apparatus wherein the size, balance, and configuration of the tool utilized therein are not adversely affected by reason of a thermal sensing means being incorporated within and forming a part of the tool.

Further and additional objects will appear from the description, accompanying drawings and appended claims.

In accordance with one embodiment of the invention, an improved apparatus is provided which effectively controls the frictional heat which is generated on a workpiece surface when the latter is frictionally engaged by the working surface of a predetermined tool. The tool includes a thermal sensing means embodied within the matrix of the tool. The thermal sensing means is provided with a first section exposed on the working surface of the tool and an exposed second section which is remote from the workpiece surface. A drive and positioning means is provided for the tool for effecting movement of the tool relative to the workpiece, when the surfaces thereof are in frictional engagement and for adjusting the tool working surface into and out of frictional engagement with respect to the workpiece surface. A detecting means is provided having a segment thereof in a predetermined temperature-detecting position with respect to the second section of the thermal sensing means. The detecting means is operatively connected to the drive and positioning means for the tool and adjustment of the latter is responsive to the variations in temperatures detected by the segment of the detecting means.

DESCRIPTION

For a more complete understanding of the invention, reference should be made to the drawing wherein:

FIG. 1 is a schematic diagram of one form of the improved apparatus.

FIG. 2 is an enlarged perspective view of the tool embodied in the apparatus of FIG. 1.

FIG. 3 is an enlarged fragmentary sectional view taken along line 3—3 of FIG. 2 and showing the working surface of the tool and one section of the thermal sensing means in frictional engagement with a working surface.

Referring now to the drawing and more particularly to FIG. 1, one embodiment of the improved apparatus 10 is shown which includes a rotatably mounted tool 11 shown frictionally engaging a surface S of a workpiece W. The tool 11, as seen more clearly in FIG. 3, comprises a grinding wheel which is keyed or otherwise secured to a drive shaft 12. The shaft is driven by a suitable variable speed electric motor M, which is mounted for adjustment in the direction of arrow A thereby permitting the tool 11 to be moved into and out of contact with the workpiece surface S.

Disposed adjacent one face 11a of the tool 11 and in a predetermined spaced relation d with respect thereto is a segment 13 of a thermal detecting unit U. The segment 13 may be a conventional detecting head with high speed response time in the range of approximately 80 microns per second and having the capability of detecting infrared radiation. The segment 13 is mounted so as to move with the motor mount M once the segment has been properly positioned with respect to the tool surface 11a, as will be described more fully hereinafter.

The matrix X of the tool 11 has embedded therein a thermal sensing element 14 which in one embodiment is cord-like in configuration and may be formed of a bundle of optic fibers, such as glass fibers (each being approximately 0.035 inch diameter), which are disposed within a suitable epoxy filler. The element 14 may have an outside diameter of 0.090 inch and has one end or section 14a thereof exposed on the working surface 11b of the tool 11. The tool working surface 11b in the illustrated embodiment is the circumferential surface; however, in certain instances the working surface may be the endface or surface 11a. In this latter arrangement, the detecting head 13 would be mounted in a predetermined radially spaced relation with respect to the circumferential surface 11b of the tool.

As noted in FIGS. 2 and 3, the end 14a of the sensing element 14 is preferably centrally located on surface 11b, that is to say it is substantially equidistant from the endfaces of the tool and occupies only a small area of the surface 11b. By reason of the size of end 14a and its location on surface 11b, the hottest temperature (e.g. in the range of 350° F. to 700° F.) generated on the workpiece surface S is sensed by element 14.

The opposite end 14b is exposed on the endface 11a of the tool 11, as seen in FIGS. 2 and 3 and is spaced a substantial distance from the working surface 11b of the tool and the driveshaft 12 for the tool. In the illustrated embodiment, the sensing element 14 may assume a substantial L-shape with one leg thereof being radially disposed and the other leg extending in a direction substantially parallel to the tool rotary axis.

Disposed between the end 14b and the working surface 11b may be deflector plate D which will protect the detector head 13 from the splash which might occur from the circulating coolant when the rotating tool 11 is in rotational, frictional contact with the workpiece surface S. Thus, the accuracy of the temperature detection by the head 13 is not adversely affected by the coolant splash.

The relative position of the detector head 13 with respect to the element end 14b is such that the head is aligned with the path of travel of the end 14b when the tool is rotating. Because the element end 14b occupies only a small area on the tool endface 11a, the detection by the detector head will be intermittent; however, depending upon the rotational speed of the tool, the time intervals between successive detections by the head 13 will be insignificant.

The circumferential surface 11b of the tool may have a coating C of a suitable abrasive material. The abrasiveness of the coating will depend upon the nature of the work (e.g. grinding or polishing) being performed on the workpiece surface by the tool. Whether there is a coating or not on the tool surface, the end 14a of the thermal sensing element 14 is preferably in direct contact with the workpiece surface S, see FIG. 3.

One form of the detecting unit U, shown in FIG. 1 includes besides the head 13, a temperature monitor 15 having the input side 15a thereof connected to the head. The output side 15b of the monitor may be connected to the input side of a conventional micro-processor 16. The output side 16b of the micro-processor is connected to the input side 17a of a control unit 17 which in turn is operatively connected to the motor mount M and causes the speed of the motor and the rate of feed (i.e. into or away from the workpiece surface S) of the tool to be dictated by control unit 17. As aforementioned, the control unit is responsive to the output of the micro-processor 16.

The micro-processor is programmed with data such as the material of both the tool and workpiece; the critical draw temperature of the workpiece surface; the surface hardness of the workpiece; the spacing d between the element end 14b and the detector head 13; the type of abrasive coating, if any, applied to tool surface; etc. Thus, the programmed data when combined with the temperature data received from the monitor will automatically and correctly adjust the tool rotational speed and feed, thereby preventing serious damage to both the workpiece and tool.

Thus, an improved control apparatus has been provided which is capable of accurately determining the workpiece surface temperature or its change of temperature when the surface is being subjected to various operations such as grinding, polishing, or the like. The sensing of such temperature enables the coolant temperature to be properly adjusted; prevents thermal distortion of the workpiece surface; and effects prolongation of the tool life.

I claim:

1. An apparatus for controlling the temperature of a rotating first surface when in frictional engagement with a second surface, said apparatus comprising a rotating member provided with the first surface; a thermal sensing element mounted on said member and rotatable therewith as a unit, said sensing element having a first section exposed on the member first surface and being adapted to engage the second surface, and a second section exposed on the exterior of said member remote from the exposed first section, said second section defining a predetermined circular path during rotation of said member; first means for effecting rotation of said first member while the first and second surfaces are in frictional engagement; second means for effecting adjustment of the first and second surfaces from a frictional engagement; and a temperature detecting means having a fixedly mounted segment disposed in predetermined proximity to the circular path of said second section, said detecting means being operatively connected to said second means whereby adjustment of at least one of the frictionally engaged surfaces relative to the other is responsive to the temperature detected by the detecting means segment from the exposed second section of the thermal sensing element.

2. The apparatus of claim 1 wherein the thermal sensing means is provided with a substantially radially extending first portion, which includes the first section, and a second portion spaced from the rotary axis of said wheel and extending in a direction substantially parallel to said rotary axis.

3. The apparatus of claim 2 wherein the thermal sensing means is a continuous cord-like element substantially embedded within said rotating wheel.

4. The apparatus of claim 3 wherein the cord-like element comprises a plurality of elongated optic fibers compacted in side-by-side relation.

5. The apparatus of claim 1 wherein the first surface on which the first section of the thermal sensing means is exposed forms the circumference of a rotating wheel.

6. The apparatus of claim 5 wherein the exposed first section of the thermal sensing means is substantially centrally located within the circumferential surface of the rotating wheel.

7. The apparatus of claim 1 wherein the first section of the thermal sensing means occupies a relatively small area of the first surface on which it is exposed and said first section is adapted to intermittently contact the second surface when said surfaces are in frictional engagement and in relative motion.

8. The apparatus of claim 1 wherein the segment of said detecting means is sensitive to infrared emissions from the second section of said thermal sensing means.

* * * * *